United States Patent [19]

Stroomer

[11] Patent Number: 5,580,144
[45] Date of Patent: Dec. 3, 1996

[54] IMAGE PROJECTION DEVICE WITH SUPPRESSED MOIRE

[75] Inventor: Martinus V. C. Stroomer, Eindhoven, Netherlands

[73] Assignee: U.S. Philips Corporation, New York, N.Y.

[21] Appl. No.: 449,133

[22] Filed: May 24, 1995

[30] Foreign Application Priority Data

May 26, 1994 [EP] European Pat. Off. .............. 94201493

[51] Int. Cl.⁶ .................................................... G03B 21/00
[52] U.S. Cl. .............................................. 353/69; 353/38
[58] Field of Search .................................. 353/31, 33, 34, 353/37, 38, 24, 22, 69, 81, 100; 359/40, 49

[56] References Cited

U.S. PATENT DOCUMENTS

| | | | |
|---|---|---|---|
| 4,573,764 | 3/1986 | Bradley | 350/128 |
| 4,940,881 | 7/1990 | Sheets | 219/121.69 |
| 5,005,968 | 4/1991 | Tejima et al. | 353/38 |
| 5,060,058 | 10/1991 | Goldenberg et al. | 353/34 |
| 5,084,807 | 1/1992 | McKechnie et al. | 362/268 |
| 5,098,184 | 3/1992 | van den Brandt et al. | 353/31 |
| 5,250,967 | 10/1993 | Miyashita | 353/38 |

FOREIGN PATENT DOCUMENTS 4125536  4/1992  Japan .

*Primary Examiner*—William Dowling
*Attorney, Agent, or Firm*—John C. Fox; Norman N. Spain

[57] ABSTRACT

The invention relates to an image projection device. This device comprises an illumination system having a lamp for supplying an illumination beam, at least one image display panel for modulating the illumination beam in accordance with an image to be projected to a signal beam, and a projection lens system for projecting the image on a projection screen. To suppress Moiré interference between the structure of the image projection screen and the image display panel, an optically transparent beam-displacing element is arranged at an angle with respect to the signal beam axis in at least a portion of the signal beam in the light path between the image display panel and the projection screen at a position where a lamp image is present.

5 Claims, 2 Drawing Sheets

IMAGE PROJECTION DEVICE WITH SUPPRESSED MOIRE

BACKGROUND OF THE INVENTION

The invention relates to an image projection device comprising an illumination system having a lamp for supplying an illumination beam, at least one image display panel having a periodical structure of pixels for modulating the illumination beam in accordance with an image to be projected to a signal beam, and a projection lens system for projecting the image on an image projection screen.

The image projection screens which are used for said image projection devices are provided, at least at the side facing the audience room, with a periodical light-scattering structure, for example a periodical structure of elongate lenses extending in a direction which also occurs in the structure of the image display panel and whose dimensions are of the same order as the dimensions of the periodical structure of the pixels of the image display panel projected on the screen. Due to interference between the two periodical structures of the same order, disturbing Moiré patterns are produced upon projection on the screen. The extent of Moiré interference, in other words, the modulation depth of the interference pattern is dependent on the ratio between the pitch of the periodical light-scattering structure of the screen and the pitch of the pixels of the image display panel, on the size of the active portion within a pixel and on the configuration of the pixels in the panel. The configuration may comprise rows of pixels, with the pixels of two adjacent rows being exactly subjacent to each other. This is referred to as the orthogonal structure. In another configuration the pixels of two adjacent rows are offset by half a pitch with respect to each other. This is referred to as the delta structure.

An image projection device of the type described in the preamble, in which such Moiré interference is reduced, is known from the English-language Abstract of JP-A 4-125536. In the image projection device described in this Abstract a plane-parallel plate is arranged in the light path between the liquid crystal display panel and the projection lens in the beam at an angle with respect to the horizontal and vertical axes of the image display panel, such that the periodical structure of the panel is sharply imaged in one direction only, while the image in the other direction in which Moiré interference occurs is defocused. However, this has the drawback that the imaging quality of the image to be projected itself will be worse in one direction.

OBJECTS AND SUMMARY OF THE INVENTION

It is an object of the invention to provide an image projection device in which Moiré interference is suppressed while simultaneously maintaining the imaging quality in all directions.

To this end the image projection device according to the invention is characterized in that an optically transparent beam-displacing element is arranged at an angle with respect to the signal beam axis in a portion of the signal beam in the light path between the image display panel and the projection screen at a position where a lamp image is present.

By arranging a beam-displacing element in a portion of the signal beam, the image display panel is imaged twice on the screen. The radiation which is incident on the beam-displacing element will be laterally displaced and leads to an image which is offset with respect to the image coming from the other portion of the beam. By varying the thickness of the element and the angle of tilt of the element with respect to the signal beam axis, the size of the mutual offset of the two images can be fixed. The displacement which is necessary to suppress the Moiré interference is determined by the configuration of the pixels in the image display panel, by the ratio between the pitch of the periodical scattering structure of the screen and the pitch of the structure of the image display panel and by the size of the active portion within a pixel.

The two images which are offset with respect to each other both cause Moiré interference of a different intensity and an opposite phase so that they will at least partly suppress each other.

Since the beam-displacing element is arranged at a position where a lamp image is present, each point of the element receives radiation from all pixels of the image display panel, while the light coming from each point of the element is spread throughout the projection screen. At this position, the beam-displacing element thus has an effect on the complete image.

Since the required offset of the pixels with respect to each other is generally relatively small, it is sufficient to use a relatively thin beam-displacing element which is tilted through only a relatively small angle. In this way hardly any astigmatism is introduced and the imaging quality is maintained in all directions.

A preferred embodiment of the image projection device according to the invention is characterized in that the beam-displacing element extends in substantially half the signal beam.

In this case the intensity of the signal beam is substantially equally distributed on the two images which are offset with respect to each other. The two Moiré patterns then have an equal amplitude and an equal, but opposite phase.

In an image projection device a lamp image can be formed between the image display panel and the projection lens system by means of extra lenses so as to be able to arrange the beam-displacing element in the plane of this image. In order to maintain the dimension measured along the beam axis as small as possible, the device is preferably characterized in that the beam-displacing element is arranged in the entrance pupil of the projection lens system.

Advantageous use is made of the fact that in well-designed image projection devices the lamp is ultimately imaged in this entrance pupil.

If the beam-displacing element is arranged in the entrance pupil of the projection lens system, the beam-displacing element may be integrated in the projection lens and need not be added as a separate component to the image projection device.

BRIEF DESCRIPTION OF THE DRAWINGS

These and other aspects of the invention will be apparent from and elucidated with reference to the embodiments described hereinafter.

In the drawings

DESCRIPTION OF THE PREFERRED EMBODIMENTS

Figure 1:
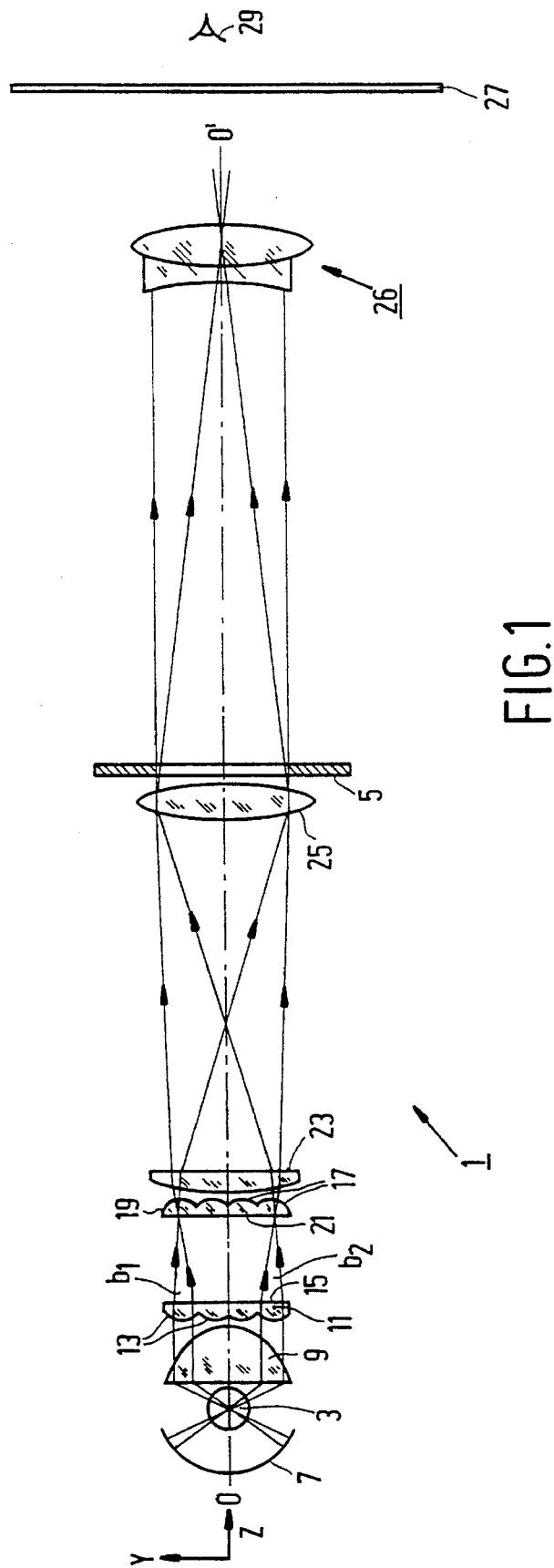
FIG. 1 shows diagrammatically an embodiment of a known monochrome image projection device.

The image projection device shown in FIG. 1 is described in, for example U.S. Pat. No. 5,098,184. The image projection device 1 comprises a lamp 3 which emits light in the direction of the image display panel 5 and in the backward direction. A spherical reflector 7 which receives the backwardly emitted light and forms an image of the lamp 3 is arranged at the rear side of this lamp. In the Figure the image of the lamp formed by the reflector 7 coincides with the lamp 3. It has been assumed that the lamp is transparent to its own light. In practice, this is generally not the case and it is ensured that the lamp and the lamp image are situated next to each other. The light emitted by the lamp 3 and its image is received by a condensor lens system 9 which concentrates this light to a parallel beam which is subsequently incident on a first lens plate 11. The side of this plate facing the source is provided with a matrix of lenses 13 and the other side 15 is preferably plane. For the sake of simplicity, only four lenses are shown. Actually, the plate 11 comprises, for example 8×6 lenses. Each of these lenses 13 images the source 3 on an associated lens 17 of a second lens plate 19. The side 21 of this plate 19 facing the source 3 is plane, whereas the side remote from the source carries a matrix of lenses 17. The number of rows and columns of lenses of the two plates 11 and 19 corresponds. For imaging the source 3 by means of the different lenses 13 on the corresponding lenses 17, each time a different portion of the incident beam is used. For the sake of simplicity, FIG. 1 shows only two sub-beams $b_1$ and $b_2$. Each of the lenses 17 provides an image of a radiation spot formed on the corresponding lens 13 on the image display panel 5. Lenses 23 and 25 ensuring that all re-images are superimposed in the plane of the image display panel are arranged behind the second lens plate 19.

The light beam modulated by the image display panel 5 in conformity with the image to be projected is subsequently projected as a signal beam by a projection lens system 26 on an image projection screen 27, for example a transmissive image projection screen. The viewer 29 is present at the side of the image projection screen remote from the illumination system. An image projection screen suitable for such an application is known, for example from U.S. Pat. No. 4,573,764 and at the side facing the viewer 29 it is provided with a periodical scattering structure, for example a linear lens structure so as to spread the projected radiation in a horizontal direction uniformly across the audience space. The pitch of such a periodical structure is of the order of several tenths of a min. The periodical structure of the pixels of the image display panel, when projected on a projection screen, has a period of the same order. Since both periodical structures are of the same order, the two periodical structures will interfere upon projection of the image on the projection screen and cause a disturbing Moiré interference. Even when the ratio between the pitches of the two structures is a factor n, in which n is an integer, Moiré interference may occur. Its modulation depth is also determined by the size of the active portion within a pixel. The extent of Moiré interference is thus determined by the ratio between the pitch of the periodical structure of the screen and the pitch of the structure of the image display panel, by the size of the active portion within a pixel and by the configuration of the pixels in the image display panel.

Figure 2:
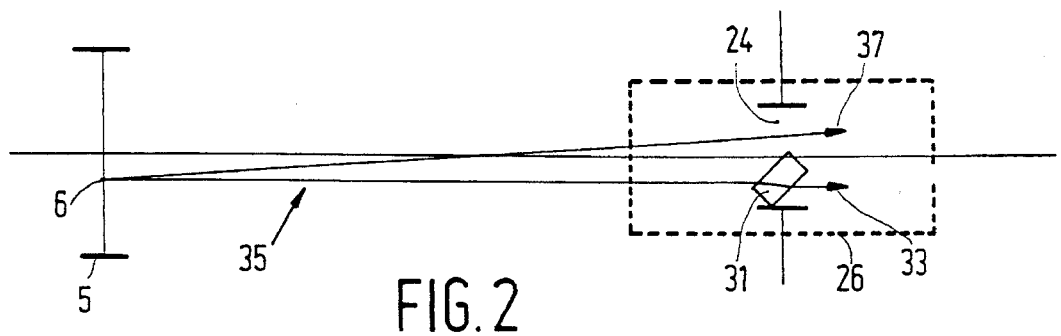
FIG. 2 shows diagrammatically in detail the light path between the image display panel and the projection lens system in an image projection device according to the invention.

In the present invention it is proposed to arrange an optical transparent beam-displacing element 31 in a portion 33 of the signal beam 35 which is projected on the screen, in an image projection device as shown in FIG. 1 in the light path between the image display panel 5 and the projection screen 27 and at a position where a lamp image is present. The other sub-beam 37 is passed directly towards the projection screen. FIG. 2 shows diagrammatically the part of the radiation path from the image display panel 5 to the projection lens system 26 of a device using such an element 31. The reference numeral 35 indicates a light beam which starts from a pixel 6 of the panel. This element in the form of a plane-parallel plate, which is arranged obliquely with respect to the beam axis, is present in only a portion 33 of the beam and displaces the beam portion passing through it parallel to itself. The direction of the displacement is perpendicular to the longitudinal direction of the lens structure on the projection screen. The extent of displacement is determined by the thickness of the beam-displacing element 31 and by the angle at which it is arranged with respect to the signal beam axis. The other beam portion 37 is passed unhindered towards the screen. Since the beam portions 33, 37 from the pixel 6 are offset with respect to each other, the projection lens images this pixel in two mutually offset pixels on a projection screen which is not shown in FIG. 2. Consequently, two images which are offset with respect to each other are produced on the projection screen.

In order that the beam-displacing element 31 treats the light beams of all pixels in an analogous manner, this element 31 is arranged at a position where an image of the lamp 3 in FIG. 1 is formed.

In the plane in which an image of the lamp is formed, each point receives light from each pixel of the image display panel, while the light coming from each point of this plane is spread throughout the projection screen. At this position the beam-displacing element 31 influences the complete image. In principle, the beam-displacing element may be small and cover only a small portion of the beam 35. However, then the light energy in the beam portion 33 which has passed the element 31 is smaller than that of the other beam portion 37 and the images which are offset with respect to each other on the projection screen have different brightnesses. By ensuring that the beam-displacing element covers half the signal beam, a preferred embodiment is obtained in which the offset images on the screen have the same brightness. When the element 31 is arranged in half the beam 35, the projected images interfere to the same extent with the structure of this screen. The two images are thereby displaced with respect to each other through half a pitch of the structure of the image display panel and the interference patterns are in opposite phase so that no interference is visible any longer at some distance from the screen.

If it is sufficient to use a different extent of Moiré suppression, a beam displacement other than half a pitch of the image display panel can be chosen.

A position at which a lamp image is present is, for example the entrance pupil 24 of the projection lens 25, as is shown in FIG. 2. The beam-displacing element 31 can then be integrated in the lens 25 and does not constitute an additional separate component. Alternatively, an extra lamp image can be realised in the light path between the image display panel and the projection lens by means of a lens. The beam-displacing element 31 can then be arranged at the position of this lamp image. However, for realising the extra lamp image, extra space within the device is necessary so that the arrangement of the element 31 in the projection lens is preferred from the point of view of compactness of the device.

The beam-displacing element 31 may be, for example a plane-parallel plate, as is shown in FIG. 2.

Figure 3A:
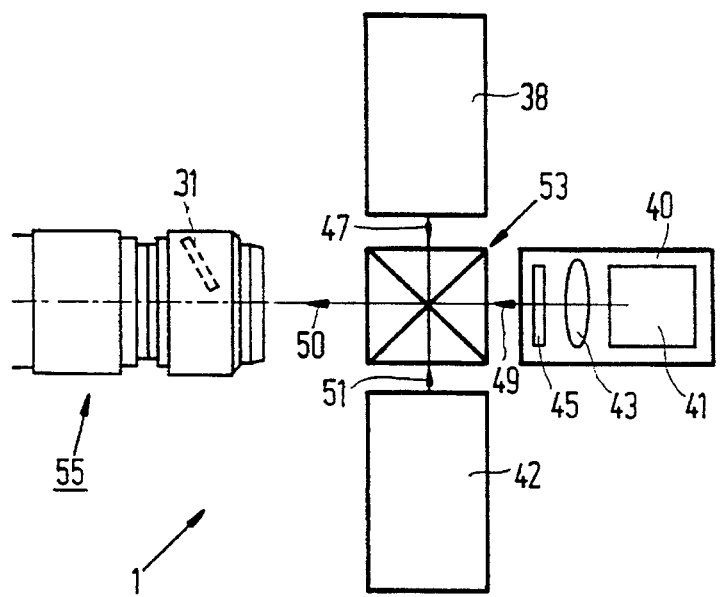
FIGS. 3a and 3b show diagrammatically some embodiments of a colour image projection device according to the invention.
Figure 3B:
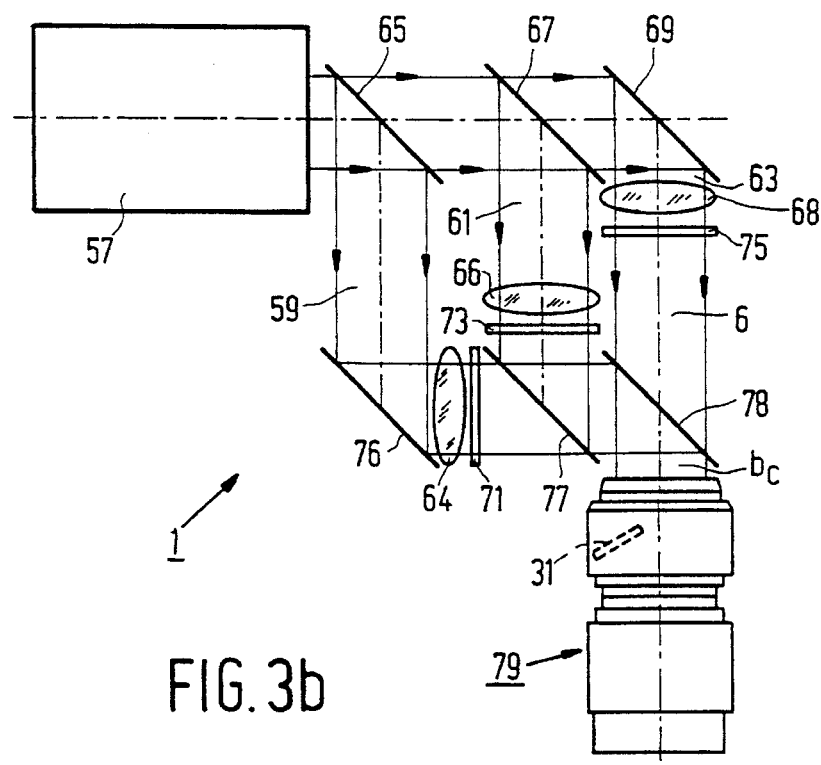

The image projection device shown in FIG. 1 is a monochrome image projection device, but the present invention is not limited thereto and may alternatively be used in a colour image projection device. A colour image projection device is known, for example from the afore-mentioned U.S. Pat. No. 5,098,184 and is shown in FIGS. 3a and 3b. The device shown in FIG. 3a has three colour channels 38, 40, 42, one for each of the primary colours red, green and blue. Each colour channel comprises an illumination system 41, a lens 43 and a transmission image display panel 45. These elements are shown in the Figure in the green channel. The monochrome beams 47, 49, 51 modulated with image information are combined to a single beam 50 by means of, for example a dichroic cross 53. Subsequently the beam 50 is projected by the projection lens 55 on the screen (not shown). In this embodiment of the image projection device 1, the beam-displacing element 31 may be arranged in each of the colour channels 38, 40, 42 for the purpose of suppressing Moiré interference, if a lamp image is formed in these channels between the image display panel and the dichroic cross 53. However, one beam-displacing element 31 is preferably arranged in the combined beam 50, as is shown by means of a broken line in FIG. 3a.

FIG. 3b shows a further configuration of a colour image projection device. In this device use is made of one illumination system 57 only, whose radiation is split into three monochrome beams 59, 61, 63 by means of colour-selective reflectors 65, 67 and mirrors 69 and 76 red passed via lenses 64, 66, 68 to monochrome image display panels 71, 73, 75. The modulated monochrome beams are combined by the colour-selective reflectors 77, 78 and passed to the projection lens 79 in which a beam-displacing element 31 can be arranged for suppressing the Moiré interference on the screen (not shown). Here again separate beam-displacing elements may be arranged in the separate colour channels from the image display panels to the recombination mirror 78. Such an element 31 is preferably arranged in the path of the combined beam $b_c$, for example in the projection lens 79, as is shown by means of a broken line in FIG. 3b.

The invention described above is not limited to suppressing Moiré interference in an image projection device whose image projection screen has a periodical structure at the side facing the viewer, but may alternatively be used for any periodical structure on the screen which is of the same order as the periodical structure of the image display panel projected on the screen.

I claim:

1. An image projection device comprising an illumination system having a lamp for supplying an illumination beam, at least one image display panel having a periodical structure of pixels for modulating the illumination beam in accordance with an image to be projected to a signal beam, and a projection lens system for projecting the image on an image projection screen, characterized in that an optically transparent beam-displacing element is arranged at an angle with respect to the signal beam axis and extends through only a portion of the signal beam in the light path between the image display panel and the projection screen at a position where a lamp image is present.

2. An image projection device as claimed in claim 1, characterized in that the beam-displacing element extends in substantially half the signal beam.

3. A colour image projection device comprising an illumination system having a lamp for supplying an illumination beam, means for splitting the radiation beam into three monochrome sub-beams, three monochrome image display panels having a periodical structure of pixels for modulating the sub-beams in conformity with an image to be projected to signal sub-beams, means for recombining the signal sub-beams to a single signal beam, and a projection lens system for projecting the image on an image projection screen, characterized in that an optically transparent beam-displacing element is arranged at an angle with respect to the signal beam axis and extends through only a portion of the signal beam at a position where a lamp image is present.

4. An image projection device comprising an illumination system having a lamp for supplying an illumination beam, at least one image display panel having a periodical structure of pixels for modulating the illumination beam in accordance with an image to be projected to a signal beam, and a projection lens system for projecting the image on an image projection screen, said projection lens system having an entrance pupil, characterized in that an optically transparent beam-displacing element is arranged at an angle with respect to the signal beam axis in a portion of the signal beam between the image display panel and the projection screen at a position where a lamp image is present, said position being in the entrance pupil.

5. An image projection device as claimed in claim 4 wherein the beam-displacing element extends in substantially half the signal beam.

\* \* \* \* \*